July 10, 1951  P. H. KIRKPATRICK  2,559,972
FORMATION OF X-RAY IMAGES BY REFRACTIVE FOCUSING
Filed July 28, 1950
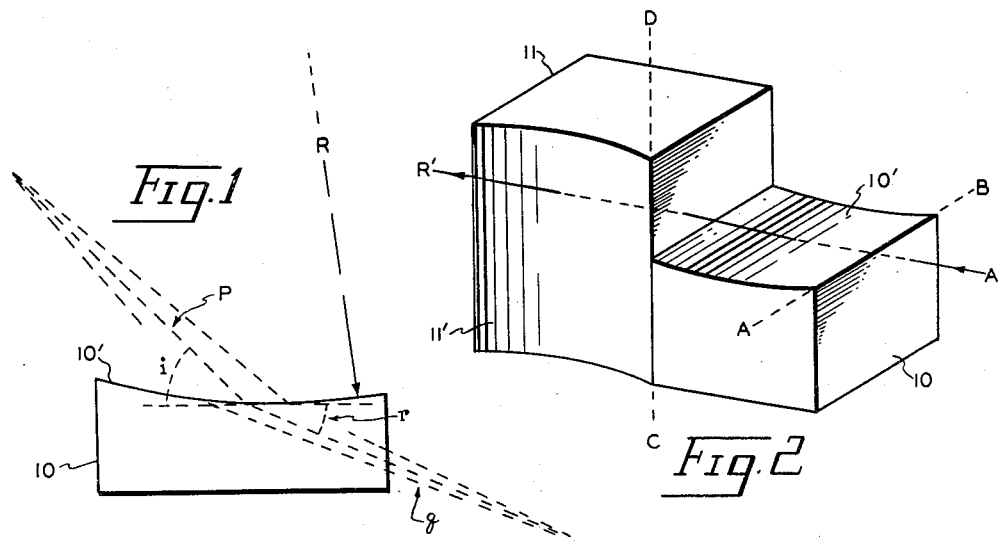
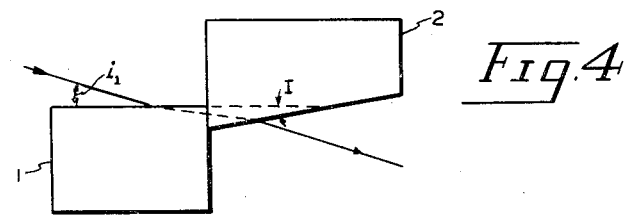
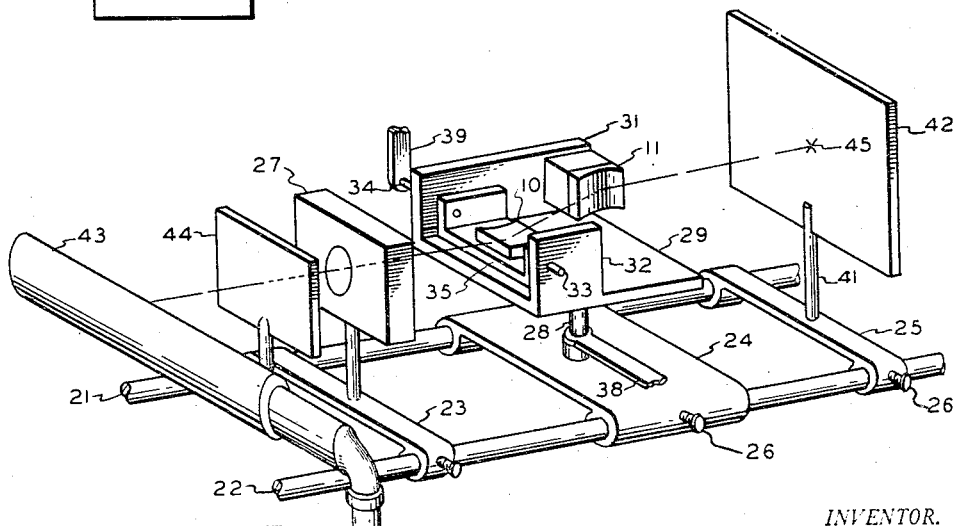
INVENTOR.
PAUL H. KIRKPATRICK
BY Stowell & Evans

UNITED STATES PATENT OFFICE 2,559,972

FORMATION OF X-RAY IMAGES BY REFRACTIVE FOCUSING

Paul H. Kirkpatrick, Stanford University, Calif., assignor to Research Corporation, New York, N. Y., a corporation of New York Application July 28, 1950, Serial No. 176,504

5 Claims. (Cl. 250—53)

This invention relates to a method and apparatus for the focusing of short wave electromagnetic radiation such as X-rays and gamma rays.

In my application Serial No. 62,452, filed November 29, 1949, I have described a method and apparatus for the focusing of electromagnetic radiation of short wave length by reflecting the rays at grazing incidence from at least one curved reflecting surface.

I have now found that rays of short wave electromagnetic radiation may be focused by disposing in the path of such rays, a thin prism having at least one concave face positioned at a small angle to the path of the rays.

An object of the invention is the provision of optical systems whereby the convergence of a bundle of short wave length rays of electromagnetic radiation may be altered by refraction to produce useful images. Such systems are particularly useful under conditions in which the limited resolution of optical microscopes and the limited penetrating power of the electron beam of electron microscopes restrict the usefulness of instruments of both types.

The principles of the invention and illustrative embodiments thereof will be more particularly described with reference to the accompanying drawings in which:

Fig. 1 is schematic diagram in side elevation of a focusing prism embodying the principles of the invention including a diagrammatic representation of the path of a bundle of X-rays passing therethrough;

Fig. 2 is a diagrammatic representation of a prism system embodying the principles of the invention;

Fig. 3 is an isometric representation of an X-ray imaging apparatus embodying the prism system of Fig. 2; and Fig. 4 is a diagrammatic representation of a modified form of the X-ray refracting prism of the invention.

Referring particularly to Fig. 1, 10 is a refracting prism, the upper surface 10' of which is a concave curved surface, for example, spherical or elliptical. The focusing of X-rays by such a prism is governed by the approximate equation:

$$1/p + c^2/q = (1-c)/Ri$$

wherein R is the radius of curvature of the refracting surface 10', $i$ is the angle between the surface and the external ray, $c$ is the ratio of the internal to the external grazing angle at the point of incidence, and $p$ and $q$ are object and image distances, $p$ being associated with the external and $q$ with the internal ray, regardless of the actual direction of ray propagation. The significant ray deviation is all in the plane of the figure; the focusing being practically that of a cylindrical lens, even though the actual surface curvature may be spherical, so that a point object is imaged as a line image. The magnification is $q/pc$.

To image a point source as a point image, it is necessary to employ a pair of refracting prisms with their curved surfaces in "crossed" position as illustrated in Fig. 2, wherein 10 and 11 are prisms of the type shown in Fig. 1, the curved surface 11' of prism 11 being oriented to produce convergence in a plane perpendicular to the plane of convergence of prism 10. A single ray R—R' is shown passing through the system, but a divergent bundle of monochromatic rays, originating at a suitable point to the right of the figure, would be converged by this system of cylindrical prisms to a point image somewhere at the left. The two cylindrical prisms constitute a refractive lens.

The concave surfaces shown may be sufficiently approximated by portions of circular cylinders. The circular approximation is subject to less objection in an X-ray lens than in a focusing mirror, since the effective surface of the lens is less widely extended in the ray direction, because of the strong absorption of radiation by the prism material.

Each prism has two focal lengths. For parallel rays incident upon the curved surface in the prism-to-air direction the focal length is $$Ri/(1-c)$$

wherein the symbols have the meanings defined above. When the parallel radiation is incident from the air side the focal length is $Ric^2/(1-c)$.

The formula connecting object and image distances is given above. An expression for the quantity $c$ found is:

$$c = \sqrt{1 - \frac{2\delta}{i^2}}$$

wherein $\delta = 1 - \mu$ and $\mu$ is the index of refraction of the prism material for the radiation used. It will be noted that the focal lengths become infinite when $c=1$. This means a powerless lens; to obtain power the angle $i$ must be only slightly greater than the critical angle of total reflection, which is theoretically given by:

$$i_c = \lambda [ne^2/\pi mc^2]^{\frac{1}{2}}$$

In this formula $n$ is the number of electrons per unit volume of the prism, λ is the wave-length of the X-radiation, and $e$, $m$ and $c$ are the charge and mass of the electron and the speed of light. Insertion of numerical values shows that in the readily available X-ray region the angle $i_c$ will always be under 1°. This means that the grazing angles of incidence of the ray shown in Fig. 2 must be restricted to values of this order.

For a prism material a substance of high density would offer the advantage of large $n$ and therefore large $i_c$, but such materials are unfortunately of very low transparency to X-rays. In general, glass is as satisfactory as any other material. The radius of curvature of the concave face of prisms may typically be of the order of 10 to 100 meters.

The image of a point source may be focused so as to fall on a desired plane by adjusting the angle $r$. For the first prism of Fig. 2 this is accomplished by rotating the compound prism system about the axis AB in Fig. 2. For the second prism the axis of rotation is CD. These adjustments are practically independent.

The systems above discussed may be embodied in an instrument of the character illustrated in Fig. 3, and which includes a pair of parallel rails 21 and 22 forming part of, or arranged to be mounted over, an optical bench. Mounted on these rails are slides 23, 24 and 25, each provided with a set screw 26 for securing it in any desired position along the rails. Formed integral with and upstanding from the slide 23 is an object-holder 27, in which may be mounted any object to be examined. Mounted centrally on the slide 24 for rotation on a vertical axis is a stub shaft 28 and fixed to the upper end of this shaft is a primary prism holder 29 provided with upstanding side walls 31 and 32. Pivoted to the side walls 31 and 32 on a pair of axially aligned stems 33 and 34 is a secondary prism holder 35. Supported on this secondary holder in a substantially horizontal position, is a prism 10 and mounted on the side wall 31 of the primary mirror holder 29 in a substantially vertical position, is a second prism 11. Fixed to the shaft 28 is a lever 38 by which the angular position of the primary holder 29 and consequently the prism 11 may be adjusted as desired. Similarly fixed to the stem 34 is a lever 39 by which the secondary prism holder 35 and its prism 10 may be tilted. In this connection it is to be observed that there is sufficient friction between the pin 34 and the side 31 to hold the secondary prism holder 35 in any desired adjusted position. Since the prism 10 merely rests on its support 35, it can be adjusted longitudinally as desired. Upstanding from the slide 25 is a pedestal 41 serving as a support for an X-ray detector 42 such as a sensitized plate or a fluorescent screen. Mounted to the rear of the object-holder 27 is an X-ray tube 43 which in accordance with usual practice should of course be encased in a lead housing, and the target of which is in alignment with the two prisms 10 and 11. Slidably mounted on the rails 21 and 22 between the X-ray tube 43 and the object-holder 27 is a shutter 44.

The provision of an apparatus of this type makes possible all of the adjustments required to bring the image 45 into substantial focus on the detector 42.

Because of the strong chromatic aberration of the refracting prism lens system it is desirable to use a source of substantially monochromatic radiation, such as may be provided, for example, by the well-known method of filtering the rays through an absorbing element properly chosen with relation to the atomic number of the target of the X-ray source.

The refractive lens system of the apparatus may advantageously consist of two prisms of optical glass with the concave faces (10' and 11' of Fig. 2) shaped to a radius of 58 meters. The glass prisms may be of approximately cubical proportions with a volume of about ½ cubic centimeter. With the lens adjusted so that the angles $i$ (Fig. 1) are approximately 0.0023 radian, a small object 10 centimeters from the center of the lens will be imaged 20 centimeters beyond the center of the lens, if illuminated by the strong $K_a$ radiation of molybdenum.

It is possible to replace the simple prisms of Fig. 3 by achromatic prisms. A prism achromatized for two wave-lengths would have two components, one possible disposition of which is shown in Fig. 4. Prism 2 should be made of a material substantially more refractive than the material of 1. For some wave-length λ let $\delta_2 = a\delta_1$, where $a$ is a number greater than unity. The angle $i_1$ is only slightly in excess of the critical angle of total reflection for the radiation employed. Then we must have prism 2 shaped and oriented so that $$I = (a-1)\sqrt{i_1^2 - 2\delta_1}$$

Then for two radiations of wave-lengths respectively greater and less than λ the deviations produced by the prism combination will be identical. For example, we may take $$\delta_1 = 10^{-6}$$
$$a = 3$$
$$i_1 = 0.00149 \text{ radian}$$
$$I = 0.00094 \text{ radian}$$

In the formula I is the dihedral angle between the incidence and emergence faces of the pair of components, and $i_1$ is the grazing angle of incidence at the incidence face. This combination would be achromatic for two radiations respectively about 10 per cent greater and 10 per cent less than that for which $\delta_1 = 10^{-6}$. Glasses could be selected for which these achromatized radiations would be in the region between one-half and one angstrom.

It should be noted that the short wave radiation refracting systems herein described are not only of use in producing images of objects not readily penetrated by light and electrons, but are also useful for such purposes as illuminating crystals for the observation of Bragg reflection and for making measurements of the wave lengths of X-ray characteristic lines by an extension of the Rowland grating principle. Furthermore, the convergence of X-ray beams may prove to be of considerable value in connection with X-ray therapy.

I claim:

1. An X-ray or gamma ray imaging system comprising means providing a bundle of said rays, a refracting prism having a concave face disposed in the path of the bundle of rays with its concave face at a small angle to the bundle of rays, and a detector for said rays located in the path of the rays refracted and transmitted by said prism.

2. An X-ray or gamma ray imaging system comprising means providing a bundle of said rays, a refracting prism having a concave face disposed in the path of the bundle of rays with its concave face at an angle not in excess of 1° to the bundle of rays, and a detector for said rays located in the path of the rays refracted and transmitted by said prism.

3. An X-ray or gamma ray imaging system comprising means providing a bundle of said rays, a refracting prism having a concave face of spherical curvature disposed in the path of the bundle of rays with its concave face at a small angle to the bundle of rays, and a detector for said rays located in the path of the rays refracted and transmitted by said prism.

4. An X-ray or gamma ray imaging system comprising means providing a bundle of said rays, means positioning an object in the locus of the bundle of rays, a first refracting prism having a concave face disposed in the path of those rays of said bundle which pass by or through said object with its concave face at a small angle to the bundle of rays, a second refracting prism having a concave face disposed in the path of the rays which are refracted by said first prism with its concave face at a small angle to the bundle of rays, the surfaces of incidence of the prisms being substantially perpendicular one to the other, and a detector located in the path of the rays which are refracted by said second prism.

5. An X-ray or gamma ray imaging system comprising means providing a bundle of said rays, means positioning a bundle of said rays, means positioning an object in the locus of the bundle of rays, a first refracting prism having a concave face disposed in the path of those rays of said bundle which pass by or through said object with its concave face at an angle not in excess of 1° to the bundle of rays, a second refracting prism having a concave face disposed in the path of the rays which are refracted by said first prism with its concave face at an angle not in excess of 1° to the bundle of rays, the surfaces of incidence of the prisms being substantially perpendicular one to the other, and a detector located in the path of the rays which are refracted by said second prism.

PAUL H. KIRKPATRICK.

REFERENCES CITED

The following references are of record in the file of this patent:

UNITED STATES PATENTS

| Number    | Name  | Date          |
|-----------|-------|---------------|
| 1,637,309 | David | July 26, 1927 |

OTHER REFERENCES

Focusing of an X-ray Beam by a Rocksalt Crystal, by R. M. Bozorth et al., Physical Review, April 1938, pp. 538–544.

A High Resolving Power, Curved-Crystal Focusing Spectrometer for Short Wave-Length X-rays and Gamma-Rays, by J. W. M. Du Mond, Review of Scientific Instruments, September 1947, pp. 626–638.

Introduction to Modern Physics, by F. K. Richtmyer et al., 1947 edition, McGraw-Hill Book Co., N. Y., pp. 525–526.